United States Patent
Zimmerman

(10) Patent No.: US 9,046,394 B2
(45) Date of Patent: Jun. 2, 2015

(54) WATER METER INCLUDING VARIABLE ORIFICE DEVICE

(71) Applicant: Sensus Spectrum LLC, Raleigh, NC (US)

(72) Inventor: Michael J. Zimmerman, Addison, PA (US)

(73) Assignee: Sensus Spectrum LLC, Raleigh, NC (US)

( * ) Notice: Subject to any disclaimer, the term of this patent is extended or adjusted under 35 U.S.C. 154(b) by 256 days.

(21) Appl. No.: 13/735,184

(22) Filed: Jan. 7, 2013

(65) Prior Publication Data

US 2014/0190250 A1  Jul. 10, 2014

(51) Int. Cl.
G01F 15/04 (2006.01)
G01F 1/05 (2006.01)
G01F 15/10 (2006.01)

(52) U.S. Cl.
CPC . *G01F 1/05* (2013.01); *G01F 15/10* (2013.01)

(58) Field of Classification Search
CPC .................................. G01F 15/04; G01F 5/00
USPC ..................................... 73/199, 203
See application file for complete search history.

(56) References Cited

U.S. PATENT DOCUMENTS

| | | | |
|---|---|---|---|
| 2,274,697 A * | 3/1942 | Hutchinson et al. | 73/199 |
| 2,572,308 A * | 10/1951 | Brown | 166/326 |
| 2,593,315 A | 4/1952 | Kraft | |
| 2,897,835 A | 8/1959 | Philippe | |
| 2,908,283 A | 10/1959 | Kiffer et al. | |
| 3,122,156 A | 2/1964 | Kersh | |
| 3,199,457 A | 8/1965 | Smart | |
| 3,990,299 A * | 11/1976 | Coffman | 73/199 |
| 4,691,727 A * | 9/1987 | Zorb et al. | 137/15.03 |
| 5,211,842 A | 5/1993 | Tuss et al. | |
| 5,340,291 A | 8/1994 | Benckert et al. | |
| 6,216,722 B1 | 4/2001 | Solomon | |
| 6,345,541 B1 * | 2/2002 | Hendey | 73/861.79 |
| 6,931,946 B1 * | 8/2005 | Hendey | 73/861.79 |
| 7,077,296 B2 | 7/2006 | Brown et al. | |
| 7,134,613 B2 | 11/2006 | Kah, III | |
| 7,143,645 B2 * | 12/2006 | Benson et al. | 73/238 |
| 7,237,619 B2 | 7/2007 | Mehr | |
| 7,373,261 B2 | 5/2008 | Heidl et al. | |
| D583,692 S * | 12/2008 | Ball et al. | D10/96 |
| 8,539,827 B2 * | 9/2013 | Benson et al. | 73/199 |
| 2004/0040368 A1 | 3/2004 | Guckenberger et al. | |
| 2012/0309282 A1 | 12/2012 | Norbury, Jr. et al. | |

OTHER PUBLICATIONS

International Search Report and Written Opinion dated Mar. 25, 2013.

* cited by examiner

*Primary Examiner* — Jewel V Thompson
(74) *Attorney, Agent, or Firm* — Andrus Intellectual Property Law, LLP

(57) ABSTRACT

A fire hydrant water meter having a flow restricting device that creates back pressure to restrict the flow of water through the fire hydrant water meter. The flow restricting device includes a plurality of flexible vanes that combine to define a variable orifice. As the flow of water through the meter increases, the individual flexible vanes move away from each other to expand the size of the flow orifice. The flow restricting device provides a source of back pressure to water flowing through the meter to restrict the flow rate of water and thus protect the metering device contained within the fire hydrant water meter.

16 Claims, 4 Drawing Sheets

WATER METER INCLUDING VARIABLE ORIFICE DEVICE

BACKGROUND

The present disclosure generally relates to a water meter having a flow restricting device having a variable orifice at its outlet to provide back pressure to the flow of water through the meter. More specifically, the present disclosure relates to a water meter that can be used on a fire hydrant and includes a flow restricting device including a variable orifice designed to open and close automatically based upon the water pressure flowing through the orifice.

Presently, water meters are designed to be attached to a fire hydrant to measure the amount of water being discharged from the hydrant. At many construction sites, the fire hydrant is used as a source of water for different purposes. Since the water discharged from the hydrant does not pass water through a meter, specific fire hydrant meters have been developed to measure the amount of water used at the construction site. Typically, the meter is attached directly to the hydrant and the hydrant is opened to supply water to the construction site.

In many cases, the meters are installed and used in a manner in which water is discharged through either a very short hose or without any hose. In these conditions, essentially 0 psi of back pressure is presented to the meter. The abnormally low back pressure can result in abnormally high flow rates relative to the intended flow rates for the meter. The abnormally high flow rate creates over-speeding in the meter, which is a condition in which the meter exceeds its designed flow rate and causes premature wear on the internal components of the meter. Over-speeding can often even cause catastrophic fail of the operating components within the meter.

Presently, different methods have been designed to address the abnormally high flow rates through a hydrant meter. One of these solutions includes a complex and expensive pressure release valve that utilizes multiple moving parts including springs and elastomers. Alternatively, meters have been designed with a small, solid orifice that severely restricts the flow rate of the meter. Each of these solutions includes undesirable properties and thus alternate solutions are desired.

SUMMARY

The present disclosure relates to a water meter for use with a fire hydrant to determine the amount of water flowing from the hydrant. The water meter includes a meter maincase that defines both an inlet and an outlet for the water meter. The inlet of the meter maincase is connected to the hydrant to receive a flow of water from the hydrant.

The meter maincase defines a measuring chamber that includes a metering device. The metering device is operable to measure and display the amount of water flowing through the meter maincase.

A flow restricting device is positioned between the metering device and the outlet of the meter maincase. The flow restricting device creates a source of back pressure to the flow of water through the meter maincase. The source of back pressure created by the flow restricting device limits the flow of water through the meter maincase when the water meter is used without an outlet hose or other type of water distribution network.

The flow restricting device that forms part of the water meter includes a plurality of flexible vanes that define a variable orifice through which water flows from the metering device to the outlet of the water meter. The flexible vanes each extend in the direction of water flow from a vertical plane to a location downstream from the vertical plane. The spacing between the outer ends of the flexible vanes defines the variable orifice.

The flow restricting device, including each of the plurality of flexible vanes, is formed from a material that has a known spring rate. The known spring rate of the material used to create the flow restricting device and the flexible vanes is used to determine the amount of flow allowable at various water pressures.

The flow restricting device includes a circular, outer attachment flange that allows the flow restricting device to be securely mounted within the meter maincase. The outer attachment flange is connected to an outer face surface that defines a generally vertical plane when the flow restricting device is installed in the water meter. Each of the plurality of vanes extends away from the vertical plane toward a center flow axis. The variable orifice is centered along the center flow axis and the size of the variable orifice increases or decreases depending upon the pressure of water flowing against the individual flexible vanes.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings.

DETAILED DESCRIPTION

Figure 1:
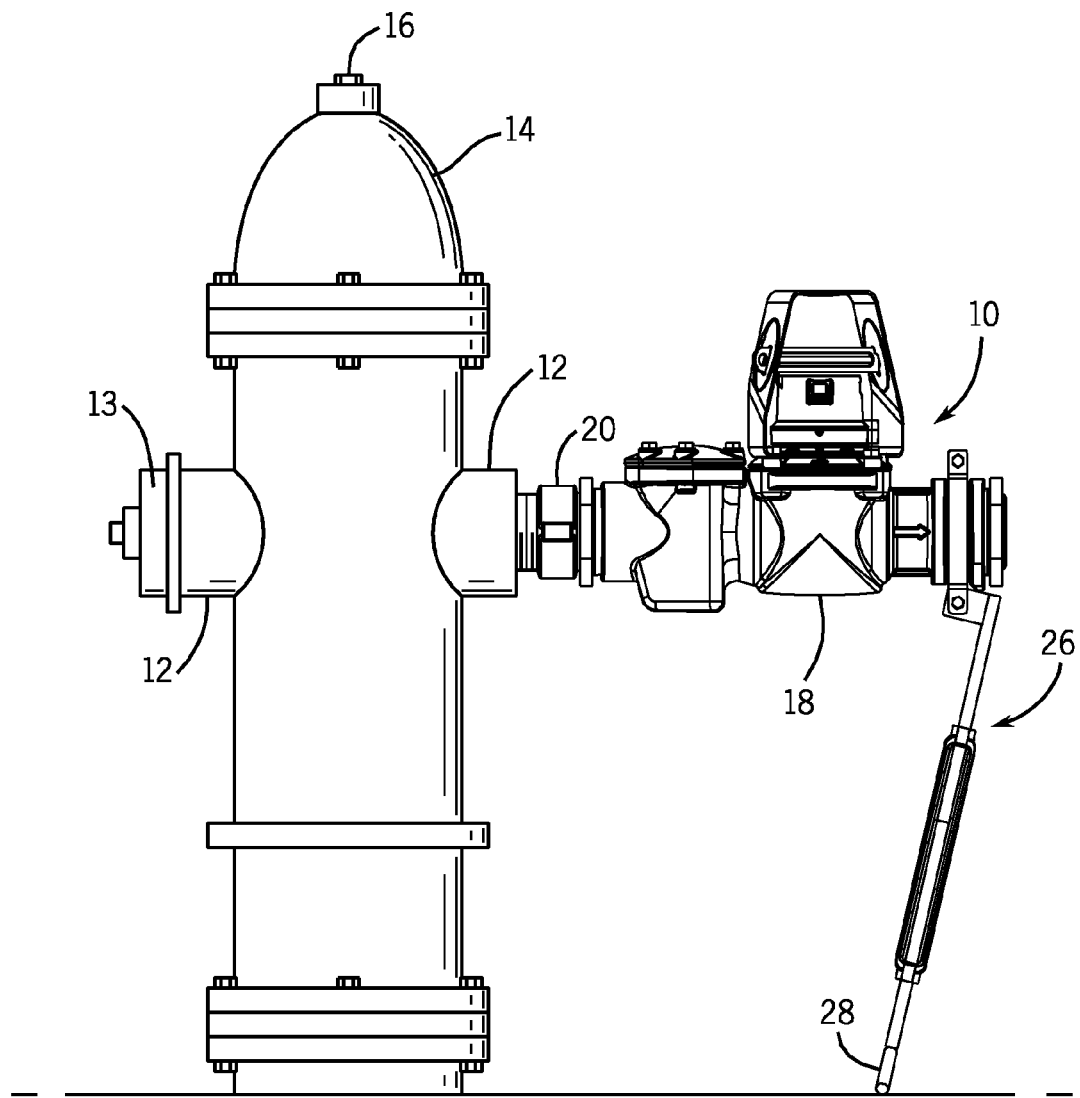
FIG. 1 is a front view of a fire hydrant including the water meter of the present disclosure.

FIG. 1 illustrates a fire hydrant water meter 10 constructed in accordance with the present disclosure. The fire hydrant water meter 10 is shown connected to one of the outlet fittings 12 of a conventional fire hydrant 14. The opposite outlet fitting 12 is shown with a cap 13 positioned on the fitting to prevent water flow therethrough. The fire hydrant 14 is connected to a water main and includes an internal valve assembly (not shown) that can be opened and closed by placing a wrench or similar device onto a top nut 16 and rotating the top nut 16. Although fire hydrants 14 are typically used by fire departments to access large supplies of water to fight fires, when buildings are being erected, the fire hydrant 14 is oftentimes the only supply of water at the construction site.

During such uses, a fire hydrant water meter 10 is connected to one of the outlet fittings 12 and the top nut 16 rotated to supply water through the installed water meter 10. The water meter 10 is used by the utility to monitor the amount of water used at the construction site. Since the construction site typically does not include its own water meter, the fire hydrant water meter 10 provides the utility with an accurate measurement of the water consumed through openings of the fire hydrant 14.

Figure 2:
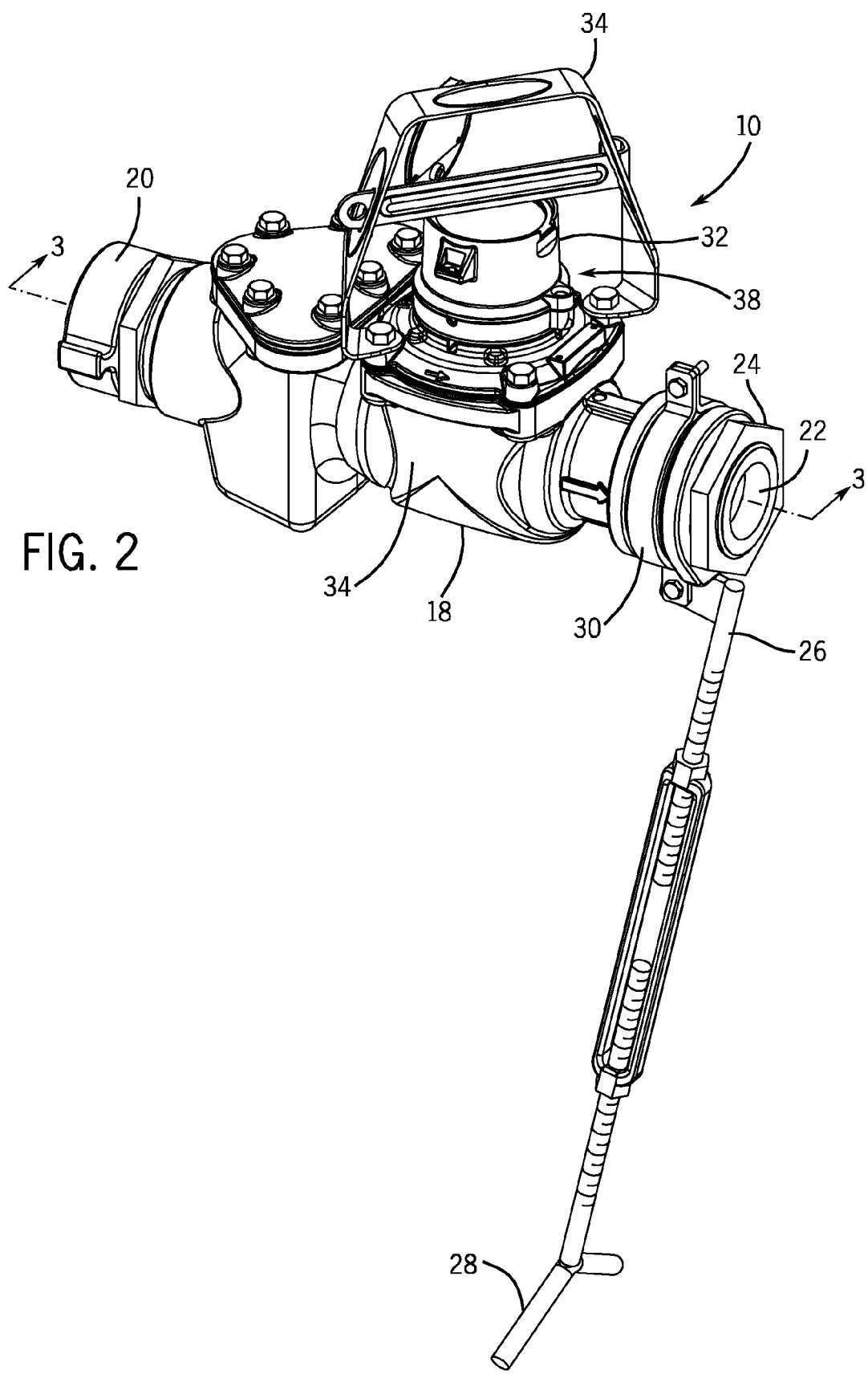
FIG. 2 is an isometric view of the water meter of the present disclosure.

As illustrated in FIGS. 1 and 2, the fire hydrant water meter includes a maincase 18 that defines an inlet and an outlet for the water meter 10. In the embodiment shown in FIG. 1, the inlet to the maincase 18 is connected to the outlet fitting 12 of the hydrant 14 through an attachment collar 20.

The maincase 18 further defines an outlet 22 that is also surrounded by an attachment collar 24, as is shown in FIG. 2. The attachment collar 24 allows the fire hydrant water meter 10 to be connected to various hoses or other types of water distribution networks. In the embodiment shown in FIG. 2, the meter 10 includes a support bracket 26 having a ground engaging stand 28. The support bracket 26 is attached to a collar 30 near the outlet of the fire hydrant water meter 10 to support the weight of the water meter 10 when the water meter 10 is connected to the hydrant 14, as shown in FIG. 1.

Figure 3:
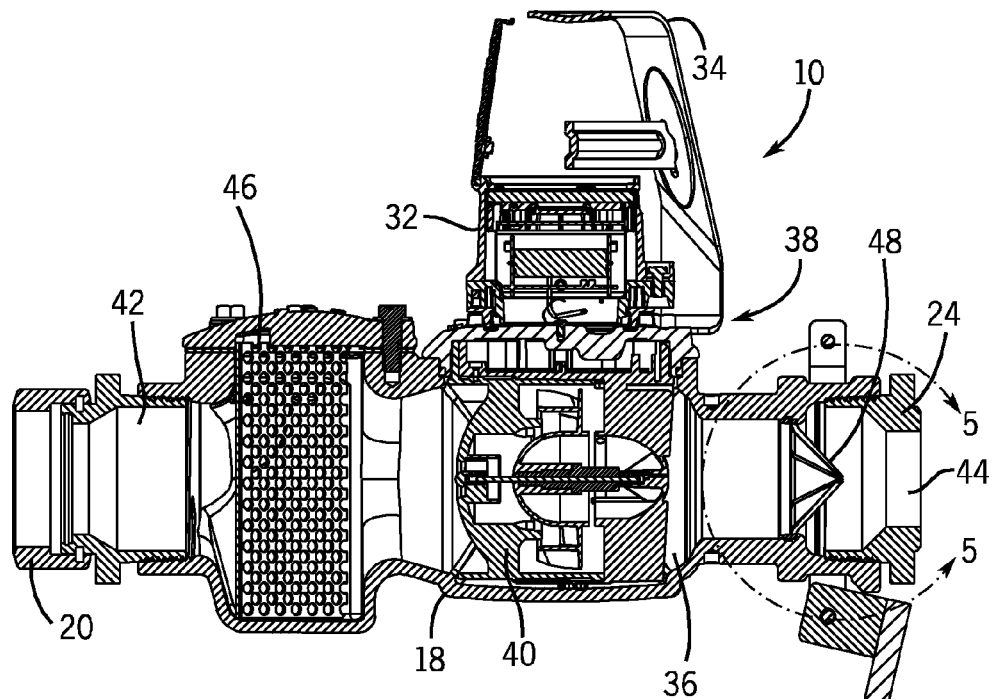
FIG. 3 is a section view taken along line 3-3 of FIG. 2.

Referring back to FIG. 2, the fire hydrant water meter 10 includes a meter register 32 that can display the amount of water that has passed through the meter 10. In the embodiment shown in FIG. 2, the meter register 32 is surrounded by a shroud 34 that both protects the meter register and aids in the transport of the water meter 10. The meter register 32 is part of a larger metering device 38 that is mounted in the measuring chamber 36 defined by the maincase 18. As shown in FIG. 3, the metering device 38 generally includes the meter register 32 and a rotor 40 that rotates to measure the amount of water flowing through the maincase 18. The details of the operating components of the metering device 38 are conventional and well known to those of ordinary skill in the art. The metering device 38 measures the flow of liquid through the maincase 18 from the inlet 42 to the outlet 44. A screen 46 can be positioned within the maincase 18 to remove any particulate matter that may be entrained in the flow of water. However, the screen 46 could be eliminated.

As discussed above, the outlet 44 of the fire hydrant water meter 10 can be connected to various different hoses or water distribution networks through the use of the attachment collar 24.

When a hose or other distribution network is connected to the outlet 44, the restricted flow of water in the hose or the distribution network creates a back pressure to the water flowing from the hydrant. However, if the outlet 44 is not connected to a hose or water distribution network, opening the hydrant creates an otherwise unrestricted flow of water through the fire hydrant water meter, which can cause the operating components of the metering device to rotate faster than designed.

In accordance with the present disclosure, a flow restricting device 48 is positioned between the metering device 38 positioned in the measuring chamber 36 and the outlet 44. The flow restricting device 48 provides a source of back pressure when a hose or other type of water distribution network is not connected to the outlet 44.

Figure 4:
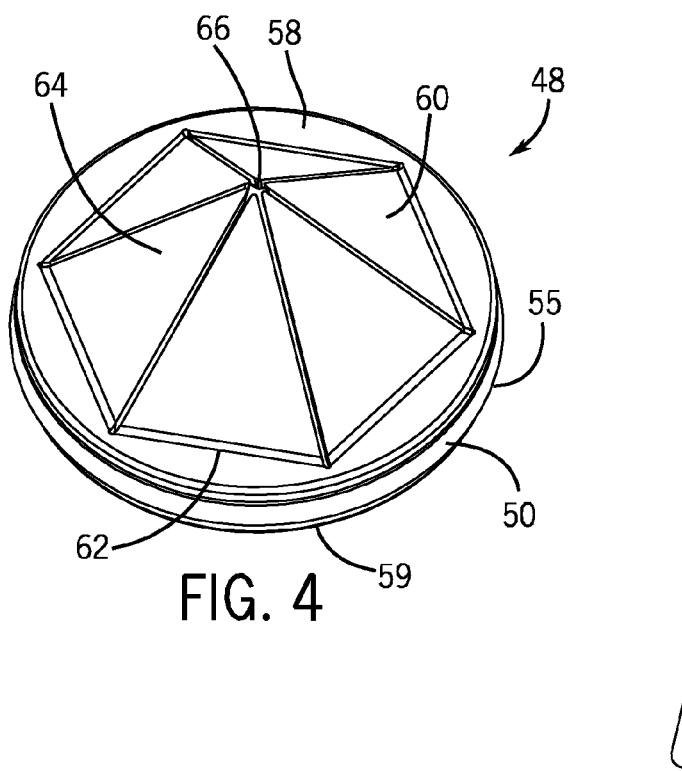
FIG. 4 is an isometric view of the flow restricting device of the present disclosure.
Figure 5:
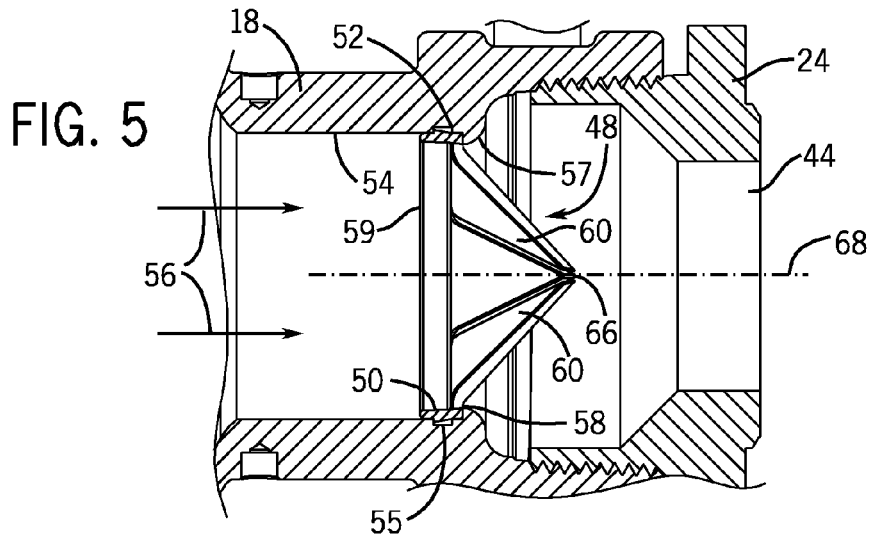
FIG. 5 is an exploded view taken along line 5-5 of FIG. 3 showing the flow restricting device in its closed position.

As illustrated in FIGS. 4 and 5, the flow restricting device 48 includes an outer attachment rim 50 that is seated within an attachment groove 52 formed along an inner wall 54 of the maincase 18. The attachment rim 50 is configured with an extending tab 55 such that the flow restricting device 48 can snap into place against a protruding shoulder 57 and is supported against the flow of water flowing in the direction shown by arrows 56 in FIG. 5.

As illustrated in FIG. 4, the flow restricting device 48 includes a generally planar outer face surface 58 spaced from the inner edge 59 by the length of the attachment rim 50. The outer face surface 58 is generally positioned along a vertical plane when the flow restricting device 48 is installed as illustrated in FIG. 5.

The flow restricting device includes a plurality of flexible vanes 60 that each extend away from the vertical plane defined by the outer face surface 58.

As illustrated in FIG. 4, each of the vanes 60 is a generally triangular-shaped member that extends from a base 62 toward a pointed, outer end 64. The pointed, outer ends 64 of each of the vanes 60 are positioned adjacent to each other and define a center orifice 66 therebetween. As illustrated in FIG. 5, the center orifice 66 is spaced from the plane defined by the outer surface 58 along the flow axis 68. The flow axis 68 defines the center of flow for liquids passing through the flow restricting member 48. As can be understood in FIG. 4, each of the vanes 60 includes a base 62 joined to the outer face surface 58 and a pointed outer end 64 that defines part of the center orifice 66.

The flow restricting device 48 is preferably formed from a suitable plastic resin that can be molded in the shape shown. The plastic resin material selected to create the flow restricting device can be designed to provide the required back pressure for the flow of water through the meter. In addition to a plastic resin, the flow restricting device could be formed from deep drawn or stamped metal such as spring steel and stainless steel. In each case, whether the flow restricting device 48 is formed from a resin or metal, the individual vanes 60 have a known spring rate that creates a back pressure to the flow of water through the meter. The back pressure created by the flow restricting device 48 limits the rate of flow of water through the meter, thereby both increasing the accuracy of the metering device while also preventing damage to the metering device.

In the embodiment shown in FIG. 4, the flow restricting device 48 includes six vanes, each of which has a generally triangular shape in which the base is wider than the outer end. Each of the vanes 60 extends away from the outer face surface 58 and extends along the flow axis 68 when the flow restricting device 48 is positioned as shown in FIG. 5. Thus, each of the vanes 60 extends away from the vertical plane and extends toward the outlet of the water meter in the same direction as the flow of material.

Figure 6:
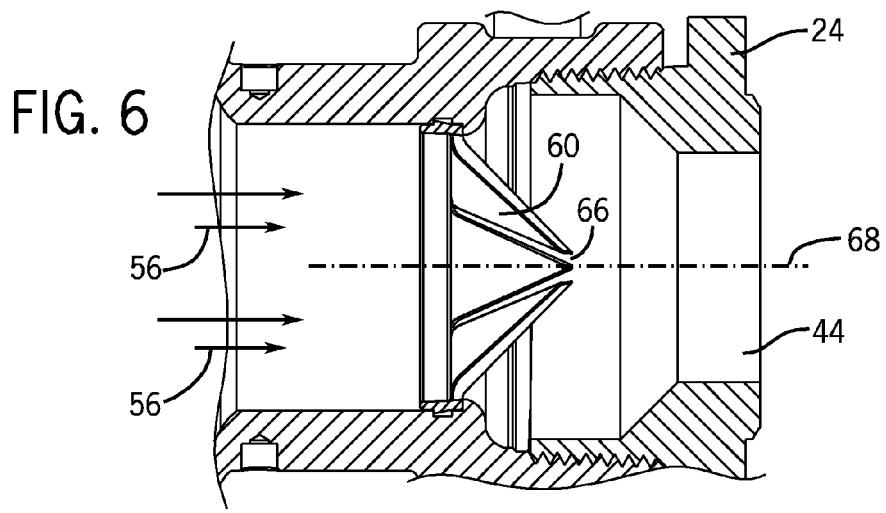
FIG. 6 is a view similar to FIG. 5 illustrating the flexible orifice in a partially open position.
Figure 7:
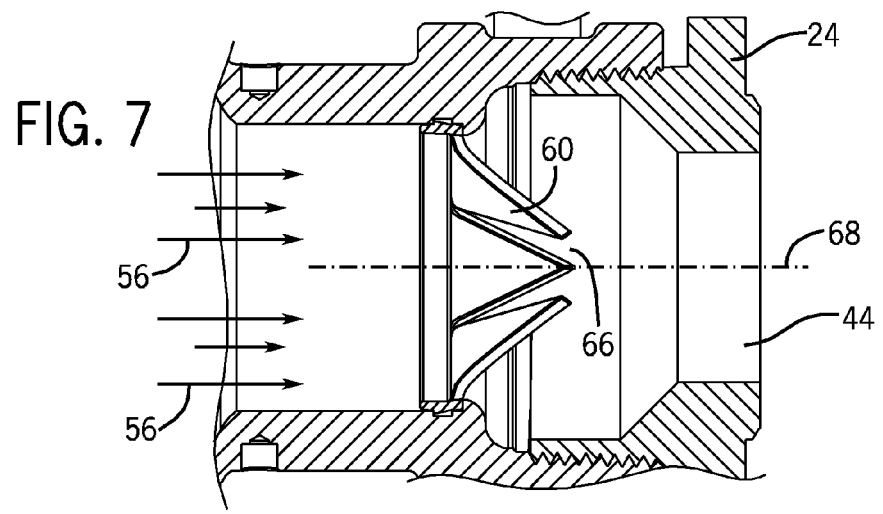
FIG. 7 is a view similar to FIG. 5 illustrating the flexible orifice in its fully open position.

Referring now to FIG. 6, when the flow of water along the flow axis 68 increases, as indicated by the arrows 56, the increased water pressure on each of the individual vanes 60 causes each of the individual vanes 60 to deflect away from the flow axis 68, thereby increasing the size of the center orifice 66. As illustrated in FIG. 7, when the flow of water increases even further, the increased pressure created by the flow of water causes further deflection of the individual vanes 60 away from the center flow axis 68. The increased deflection of each of the individual vanes 60 further increases the size of the center orifice 66, thereby allowing for a greater flow of water through the water meter.

As can be understood by the above disclosure, the use of the flow restricting device 48 having individual, flexible vanes 60 creates a back pressure to the flow of water through the water meter when either a very short hose or no hose is connected to the outlet of the water meter. The back pressure created by the flow restricting device 48 reduces the flow rate of water through the water meter, thereby reducing the potential for damage or misreadings from the metering device. The individual vanes 60 of the flow restricting device 48 are designed such that as the flow of water and thus the pressure of water increases, the individual vanes 60 flex away from a center orifice to increase the size of the center orifice. As the size of the center orifice increases, the amount of water flowing through the meter can also increase. Thus, the flow restricting device 48 of the present disclosure can increase the amount of flow through the meter as the pressure of water within the meter increases while also providing a back pressure during situations in which little or no back pressure is provided by a hose or other type of water distribution network.

I claim:

1. A water meter for determining a flow of water, comprising:
   a meter maincase defining an inlet for receiving the flow of water and an outlet for discharging the flow of water;
   a metering device positioned in the maincase between the inlet and the outlet and operable to measure the flow of water through the maincase from the inlet to the outlet; and
   a flow restricting device positioned between the metering device and the outlet, wherein the flow restricting, device includes a plurality of flexible vanes that define a variable orifice through which the water flows from the metering maincase to the outlet, wherein the flexible vanes are each biased toward a closed position to restrict the size of the variable orifice and create a source of back pressure for the flow of water through the water meter.

2. The water meter of claim 1 wherein the flexible vanes flex toward an open position to increase the size of the variable orifice upon an increase of pressure from the flow of water.

3. The water meter of claim 1 wherein the flexible vanes are formed from a plastic resin.

4. The water meter of claim 1 wherein the vanes of the flow restricting device have a known spring rate to provide the source of back pressure to the flow of water through the meter.

5. The water meter of claim 1 wherein the plurality of vanes of the flow restricting device each extend along a flow axis extending through the variable orifice and toward the outlet.

6. The water meter of claim 5 wherein the flow restricting device includes a circular outer flange located in an attachment plane, wherein the plurality of vanes each extend along the flow axis at an angle to the attachment plane.

7. The water meter of claim 1 wherein the vanes of the flow restricting device each have a base and an outer end, wherein the base is wider than the outer end.

8. The water meter of claim 1 wherein the flow restricting device including the plurality of vanes is formed as a single piece.

9. A water meter for determining a flow of water from a fire hydrant, comprising:
   a meter maincase having an outlet and an inlet connectable to the fire hydrant to receive the flow of water;
   a metering device positioned in the maincase between the inlet, and the outlet and operable to measure the flow of water through the maincase from the inlet to the outlet; and
   a flow restricting device positioned between the metering device and the outlet, wherein the flow restricting device includes a plurality of flexible vanes that define a variable orifice for water to flow into the outlet,
   where the flexible vanes of the flow restricting device are biased, toward a closed position to restrict the size of the variable orifice to create back pressure to the flow of water through the water meter and the flexible vanes flex toward an open position to increase the size of the variable orifice upon an increase of pressure from the flow of water.

10. The water meter of claim 9 wherein the flexible vanes are formed from a plastic resin.

11. The water meter of claim 9 wherein the plurality of vanes of the flow restricting device each extend along a flow axis extending through the variable orifice and toward the outlet.

12. The water meter of claim 11 wherein the flow restricting device includes a circular outer flange located in an attachment plane, wherein the plurality of vanes each extend along the flow axis at a known angle relative to the attachment plane.

13. The water meter of claim 9 wherein the vanes of the flow restricting device each have a base and an outer end, wherein the base is wider than the outer end.

14. A flow restricting device for use in a water meter, comprising:
   a generally circular attachment rim;
   a planar outer surface integrally formed with the attachment rim; and
   a plurality of flexible vanes extending away from the outer surface and toward a flow axis within the attachment rim, wherein each of the flexible vanes includes a base connected to the outer surface and an outer end, wherein the outer ends of the plurality of flexible vanes define a variable orifice therebetween, wherein the flexible vanes are each biased toward a closed position to restrict the size of the variable orifice and create a source of back pressure for the flow of water through the water meter, wherein each of the flexible vane flex toward an open position to increase the size of the variable orifice upon an increase of pressure against the flexible vanes.

15. The flow restricting device of claim 14 wherein each of the flexible vanes are formed from material having a known spring rate to bias the flexible vanes toward a closed position to restrict the size of the variable orifice.

16. The flow restricting device of claim 15 wherein the flexible vanes are formed from a plastic resin.

* * * * *